March 12, 1940. G. A. TINNERMAN 2,193,306
JOINING, CONNECTING, AND ASSEMBLING HARDENED PLASTIC PARTS
Filed May 1, 1937 2 Sheets-Sheet 2
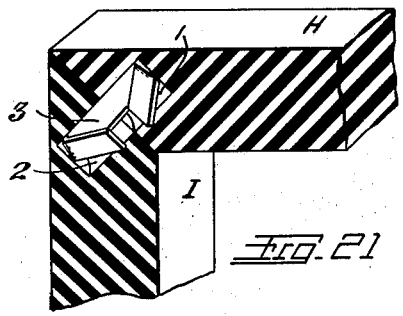
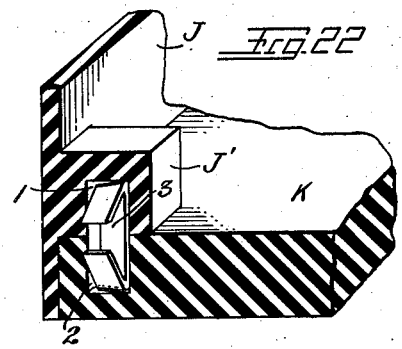
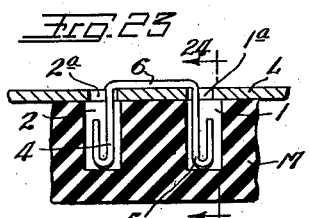
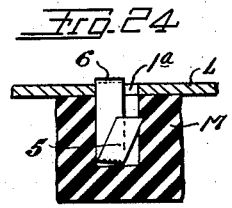
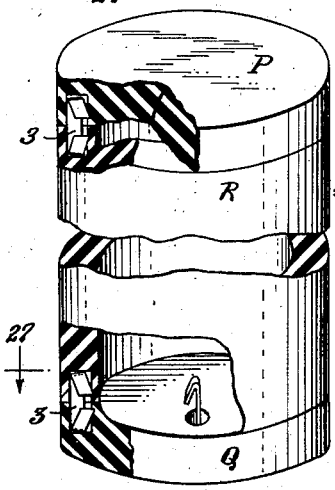
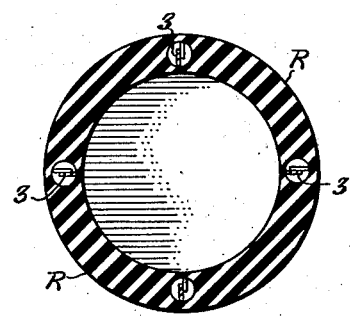
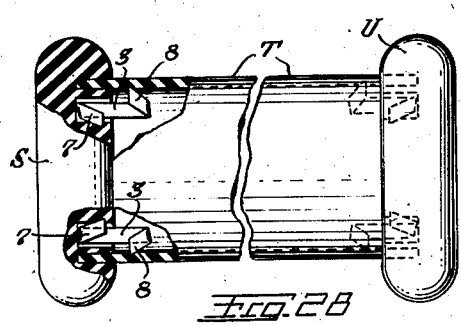
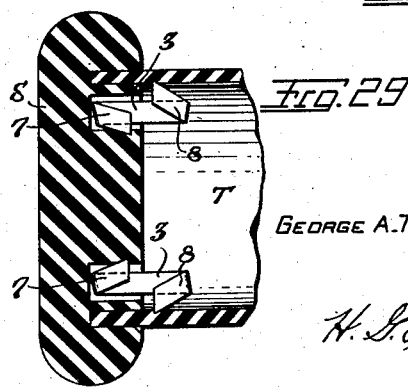
Inventor
GEORGE A. TINNERMAN
H. G. Lombard
Attorney Patented Mar. 12, 1940

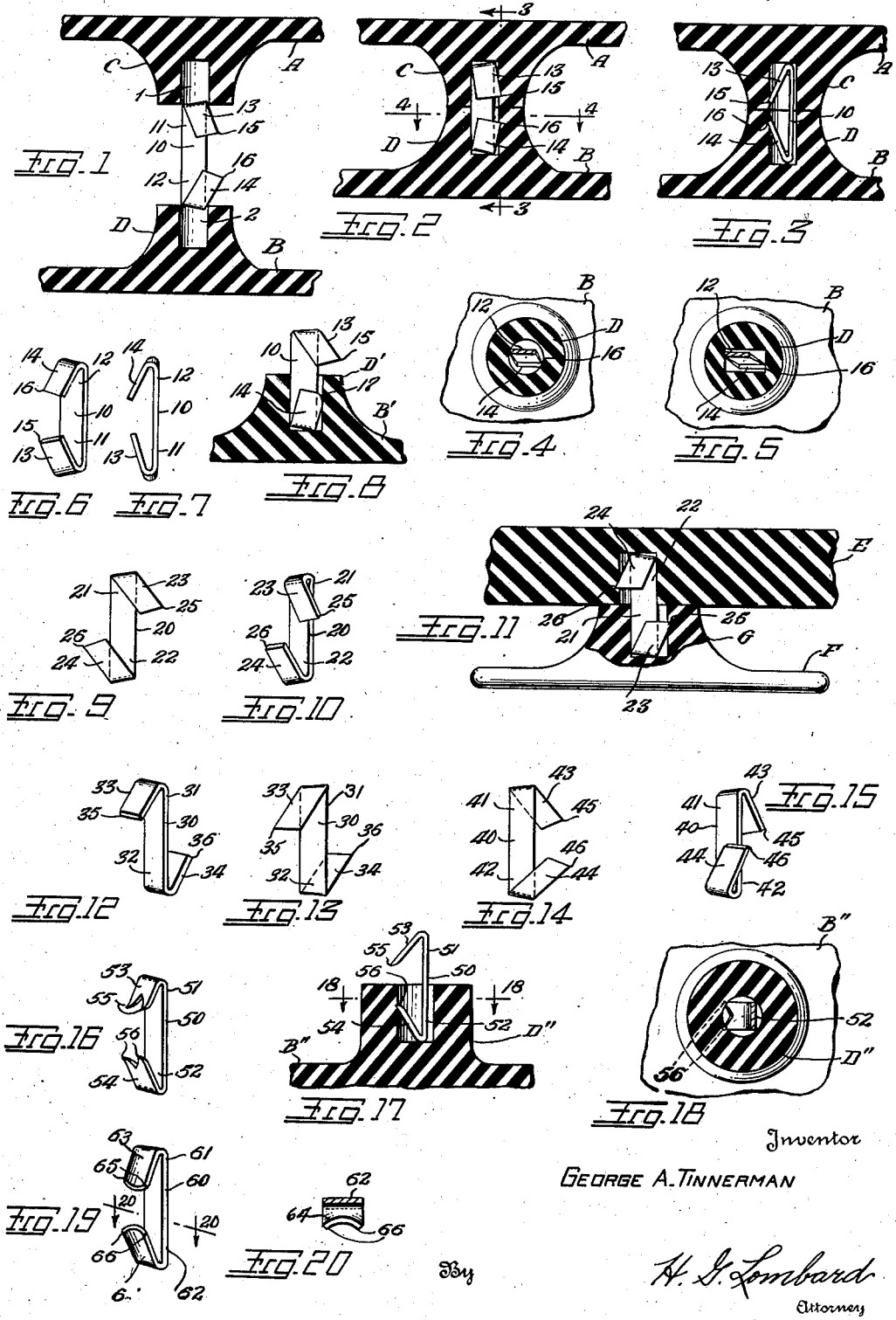

2,193,306

UNITED STATES PATENT OFFICE 2,193,306

JOINING, CONNECTING, AND ASSEMBLING HARDENED PLASTIC PARTS

George A. Tinnerman, Rocky River, Ohio, assignor, by mesne assignments, to Tinnerman Products, Inc., Cleveland, Ohio, a corporation of Ohio Application May 1, 1937, Serial No. 140,273

5 Claims. (Cl. 20—92)

This invention relates to a method and means for joining in assembled relation hardened plastic and like parts, or for connecting a plastic part to an associated, complementary or cooperating part, object or the like.

More particularly, this invention is directed to a method of joining complementary plastic parts or connecting a plastic part to an associated object or part by simple, inexpensive fastening means comprising shank members including relatively yieldable elements easily and quickly applied in an aperture in a hardened plastic or like part to tensioned relation in rigid, anchored engagement in such part.

The manufacture and use of plastic molded objects in industry has, of recent years, assumed tremendous importance and is now produced by various methods under the trade names of Bakelite, Plaskon, Tenite, Catalin, Durite, Beetle, etc. Such molded objects have as the main ingredient some form of thermoplastic material such as resin, shellac, Celluloid, synthetic rubber, and the like. Sufficient of such material is mixed with a filler, coloring matter and lubricant and placed into a mold and subjected to heat and/or pressure, or both simultaneously. The plastic mix is thus transformed into a homogeneous solid mass which becomes hardened when subjected to a curing cycle.

The plastic parts which may be thus produced find a wide and varied use in that almost any object may be duplicated even to the extent of the most difficult sizes and shapes. In addition, plastic parts are possessed of characteristics which make them more useful and advantageous in certain applications than the more common type of materials. Such characteristics, for example, are exceptional beauty, unusual dielectric properties, relatively high impact strength, high heat resistance, chip-, rust-, corrosion-, and shatter-proofness and extreme hardness, toughness and durability.

It is the property of extreme hardness which has heretofore made it difficult and in some applications prohibitive to provide a satisfactory, inexpensive means for securing separately molded parts of a plastic object in assembled relation or for connecting a plastic part to an associated cooperating part of different material. It is to be understood that in the manufacture of plastic objects the general teachings and principles of casting metals is followed such that, whenever possible or expedient, a large object is cast of hollow, complementary parts which are suitably connected in assembled relation to provide the desired object or article; this procedure is followed not only because of the expense involved in the use of large molds, but also from the standpoint of the increased weight and added material required in molding a relatively large object in one piece or in solid form.

Heretofore, in the fabrication of objects constructed of separately molded, cooperating or complementary parts made from plastic materials, the respective separately molded parts have been joined or connected in assembled relation either by the use of threaded metallic inserts molded into the plastic parts, the use of screw threaded fastening devices driven in tapped holes in the parts, or the application of an adhesive or cement to bind the parts. Due to the extreme hardness of plastic materials, the use of nails is impossible. Attempts also have been made to drive an apertured plastic part onto a rigid ratchet type shank but due to its extreme hardness, a plastic part is also relatively brittle, and will therefore crack and break under any concentrated blow or impact. It has been found that the use of threaded metallic inserts molded with the plastic parts is objectionable and expensive in that they make for increased shipping weight of the object and require longer curing cycles for hardening; also, metallic inserts involve added costs in that they require the use of special forms and molding equipment to insure that the plastic composition will not disturb the position of the metallic insert when being flowed into the mold.

In the use of screw threaded fastening devices in plastic parts, a hole must be bored, tapped and the fastening device laboriously threaded into the tapped hole. This procedure is expensive in that it requires several time-consuming operations, results in weak threads that easily cross and tend to break quickly and which are, most often, not in proper alignment due to the infinite number of porous, rough spots, thin-walled gas pockets and other mold imperfections which prevent the screw threads of a fastening from being accurately and precisely threaded into a tapped hole in a molded article.

The use of an adhesive such as cement for uniting plastic parts has been found unsatisfactory in that it tends to dry out quickly and works loose due to changes in atmospheric conditions and frequent handling. Then again, in employing a cement, the plastic parts must be subjected to an expensive and time-consuming fusing operation in order to obtain a satisfactory assembly.

It is therefore an object of this invention to provide a method of joining and connecting hardened plastic and like parts in assembled relation in the use of fastening means which are most inexpensive, light in weight, durable, and extremely simple to apply to anchored position in a plastic part.

It is a furthr object of the invention to provide a method of joining or connecting a hardened plastic part to a cooperating part or object by anchoring a fastening means in such plastic part without the necessity of tapping a hole or providing a hole of specific configuration.

A still further object of the invention aims to provide a method of joining complementary plastic parts by fastening means having a plurality of shanks which are adapted to automatically anchor into holes in the respective parts to hold the same in assembled relation.

Another object of the invention contemplates the provision of a method for assembling articles comprising hardened plastic parts by the use of securing means simplifying the assembly of such plastic parts without the necessity of adhesives, cements or special assembling operations and equipment.

A further object of the invention aims to provide a method of joining cooperating, complementary, hardened plastic parts in assembled relation to be substantially equal in strength and appearance to similar assemblies embodying the more common screw-threaded type of fastening means and considerably cheaper in manufacture and less expensive and time-consuming in application to anchored position in the plastic parts.

A still further object is to provide a method of joining or connecting in assembled relation a plastic part which is relatively thin and in which it is desired that the fastening means be concealed from view.

A more specific object is for a method of joining or connecting in assembled relation a relatively thin plastic part by the use of a nub or boss to which the fastening means may be anchored without being exposed.

Other objects and advantages of the invention will be apparent to those skilled in the art as a description thereof proceeds with reference to the accompanying drawings in which like reference characters designate like parts throughout the same and in which:

Figs. 1, 2 and 3 show generally the steps in the method of assembling complementary cooperating plastic parts in accordance with the invention, Fig. 1 illustrating a form of fastening means and the application of the respective shanks thereof to applied anchoring position in cooperating hardened plastic or like parts;

Fig. 2 shows the final step in assembling the complementary or cooperating plastic parts represented in Fig. 1;

Fig. 3 is an end section view of Fig. 2 taken along line 3—3;

Fig. 4 is a section view of Fig. 2 taken along line 4—4 illustrating the locking action of a shank member of the fastening means in a substantially round hole in the plastic part.

Fig. 5 is a similar view as applied to a substantially rectangular cavity in a plastic part;

Fig. 6 is a perspective view of the fastener means per se illustrated in Fig. 1, showing the locking leg elements of the shank members as offset both in the same direction on the same side of the body portion of the fastening means;

Fig. 7 is an end view of the device shown in Fig. 6;

Fig. 8 shows a modification in which a leg element of a shank member of the fastening means is provided with a cam shoulder permitting the same to be withdrawn from the apertured plastic part to which it is applied;

Fig. 9 shows in side elevation another form of fastening means in which the locking leg elements of the shank members are offset in opposite directions on the same side of the body portion thereof;

Fig. 10 is a perspective view of Fig. 9;

Fig. 11 shows the device of Figs. 9 and 10 as applied for securing cooperating plastic parts one of which is a trim strip, knob, button or the like;

Fig. 12 shows in perspective a further form of fastening means in which the locking legs are offset in opposite directions on opposite sides of the body portion thereof;

Fig. 13 is a side view of the device represented in Fig. 12;

Fig. 14 is a side view of a still further form of fastening means in which the locking legs are offset laterally in the same direction and on the opposite sides of the body member;

Fig. 15 is a perspective view of the device represented in Fig. 14;

Fig. 16 shows a still further form of fastening means and in which the locking legs are disposed directly opposite the body portion and are provided with prongs for engaging the side walls of the aperture in a plastic part;

Fig. 17 shows in end elevation the device of Fig. 16 as applied to an apertured plastic part;

Fig. 18 is a section view of Fig. 17 taken along line 18—18;

Fig. 19 shows in perspective, a still further form of fastening means in which the locking legs are corrugated such that their corner edges provide prongs adapted to anchor in a hole in a plastic part by digging into and becoming embedded in the side-walls thereof;

Fig. 20 is a section of Fig. 19 taken along line 20—20;

Fig. 21 illustrates the method of joining complementary plastic parts in a corner joint structure employing a form of fastening means of the invention;

Fig. 22 shows a method of assembling an object comprising complementary plastic parts, one of which is relatively thin and in which the fastening means is hidden from view;

Fig. 23 shows a method of joining cooperating plastic and like parts one of which is relatively thin, the fastening means being exposed;

Fig. 24 is a section view of Fig. 23 taken along line 24—24;

Fig. 25 shows a method of assembling an object comprising complementary hollow plastic parts employing a form of fastening means;

Fig. 26 shows a method of assembling a substantially cylindrical object comprising a plurality of separately molded members, parts of which are shown broken away to illustrate the function of the fastening means.

Fig. 27 is a section view taken along line 27—27 of Fig. 26.

Fig. 28 shows another method of assembling a hollow plastic article comprising separately molded members parts of which are shown broken away to show the function of the fastening means with a relatively thin member of the assembly, and Fig. 29 is a section view of an end of the structure represented in Fig. 28.

In the method of this invention, the fastening means generally comprise shank members including relatively yieldable leg elements at least one of which is so formed as to provide means adapted to anchor into a plastic part to prevent looseness and removal from applied position in such part. The fastening means are most economical in that they may be constructed from relatively light material such as sheet metal, cold rolled metal, wire and the like. In the drawings the fastening means are shown as constructed of sections of strip stock or blank stampings from relatively wide sheet material. It is to be understood, however, that the particular form of fastening means shown are not the basic feature of the invention, since it will be obvious to those skilled in the art that other equivalent types of fastening means may be made in other forms and from all shapes of wire, or similar stock to function in the manner of the method herein taught.

It has been found that one of the cheapest, and at the same time most effective form of fastening means which may be employed in the method of this invention is obtained from a section of strip material or a suitable blank stamping, which section or stamping is bent back upon itself to provide a shank member comprising relatively yieldable leg elements at least one of which is provided with sharp, protruding, prong means, or the like, designed to anchor the shank member in the plastic part. As shown, the fastening means function best when the leg elements thereof are integrally united to form a leading end for the respective shank, which leading end is in effect a substantial pilot element which readily seats in an aperture in a plastic part to which it is applied. However, it will quite readily be recognized that other forms of fastening means may be embodied in the method herein taught wherein the shank members comprise relatively yieldable leg elements the leading ends of which are free and normally untensioned and designed to be brought together or otherwise compressed to permit insertion thereof into an aperture in a plastic part in a press fit to thereby become tensioned to lock therein in applied fastening position by reason of prong means, or the like, carried by at least one of the tensioned leg members anchoring into and becoming embedded within the aperture in the plastic part.

Referring to the drawings, Figs. 1, 2 and 3, reference characters A, B, represent a pair of complementary plastic parts, which together form a desired object and in which it is desired that the fastening means be unexposed. Since the respective parts A, B are relatively thin and therefore could not in themselves receive a shank member of the fastening means without causing the same to be exposed, they are provided in the molding operation with integral nubs or bosses C, D, which are substantially oppositely disposed in the assembly of the object. The said bosses C, D, are provided with suitable substantially aligned apertures or holes as shown in Figs. 4, 5, either in the molding operation of the plastic part, or by drilling the boss in any expedient manner in the finishing operation of the plastic part in its hardened form.

Thus, in the assembling operation of the plastic parts A, B, Fig. 1, the nubs C, D are provided with holes 1, 2 which are in substantial alignment whereby a double-ended fastening means such as shown in Fig. 6 may be applied between the separated plastic parts with the respective leading ends of the shanks seated in the holes provided in the nubs. Upon pressure being exerted on the plastic parts to bring them together to assembled relation, the respective shank members of the fastening means advance in the holes in which they are seated to become tensioned and thus anchored therein against reverse movement such that the plastic parts are held rigidly in the desired assembled relation of the object as shown in Figs. 2 and 3.

In the form of fastening means shown employed in the assembly of Figs. 1–3 inclusive and as particularly illustrated in Figs. 6 and 7, the device comprises a pair of fastening elements formed by bending the strip body 10, back upon itself to provide shank members comprising relatively yieldable leg elements 11, 13 and 12, 14 integral in their leading ends to provide substantial pilot elements readily seated in holes in the nubs or bosses provided in the plastic parts. The free locking legs 13, 14 of the shank members may be offset laterally or in any other suitable manner such as to project the corners 15, 16 at the extremities thereof beyond the outline of their respective cooperating legs 11, 12 whereby such corners are effective as prong means for anchoring the shanks in the bosses C, D, in applied position as shown in Fig. 2.

It will be seen from the assembly represented in Fig. 1 that the leading ends of the respective shank members comprising the laterally offset leg elements 11, 13 and 12, 14 are readily seated in the respective holes in the nubs C, D and as the respective plastic parts are moved toward assembled relation the free legs, being offset a distance greater than the size of the holes in the nubs, cam the side-walls of said holes to cause a gradual, lateral movement thereof from their normal, untensioned, laterally offset relation to tensioned relation in applied fastening position, the diverging longitudinal edges presented by the offset legs facilitating such gradual, relative lateral tensioning movement of the leg members. When seated in applied fastening position in the assembled relation of the plastic parts, the prong elements 15, 16 provided by the corner extremities of the free locking legs 13, 14, of the shank members, are caused to dig into and embed themselves in the adjacent side-walls of the holes and thereby prevent looseness or reverse movement of the shank members from the respective assembled plastic parts. Preferably, the holes in the plastic parts are of predetermined depth such that the leading ends of the respective shanks are seated against the bottom walls of such holes in order that the prong means of the free locking leg of each shank member may be designed to anchor in its hole in the plastic part at the most effective point depending on the relative thickness of the part. This is most important in assemblies wherein one plastic part is of greater thickness than its complementary part such that it is most advantageous and often quite necessary to have one shank member of longer length than the other.

Although the fastening means is shown as comprising only two shank members, it is obvious that any desired number of integral shank members may be provided from a blank depending on the number of free ends which are provided and bent back to obtain the required shank legs. It is also obvious that a shank member may be molded directly into a plastic part, boss or nub such that the remaining shanks are free to be applied to holes in cooperating plastic parts or bosses carried thereby to maintain the complementary plastic parts of an object in assembled relation in accordance with the method of the invention.

In certain assemblies it is desirable or necessary that a plastic part be removable from its cooperating part without destroying, mutilating or otherwise injuring the fastening means such that it may again be used in a subsequent assembly of the object. This may be provided for as shown in Fig. 8 wherein the locking leg element 14 of the lower shank member is provided with a rounded shoulder 17 which engages under tension in the hole in plastic part B' to satisfactorily hold the same in assembled relation, yet is capable of acting as a cam means permitting the shank member to be withdrawn.

Figs. 9 and 10 show a form of fastening means substantially similar in application and use to that disclosed in Figs. 6 and 7 but in which the holes in the respective assembled parts E, F, Fig. 11, need not be in substantial alignment. The fastening means of this form may comprise a body portion 20, the free ends of which are bent back on the same side thereof to provide the leg elements 21, 23 and 22, 24 of the respective shank members, the free legs 23, 24 being laterally offset to provide the locking prongs 25, 26. Thus, in an assembly such as illustrated in Fig. 11 in which an object such as knob, panel or trim strip F having, if necessary, an apertured boss G, is mounted on a supporting apertured plastic part E, wherein the assembled parts need not be in exact position or adjustment with respect to each other, the holes in the respective parts need not be in exact alignment or precisely disposed. The fastening means of this form are balanced in engagement in the respective parts to be most effective in holding position due to the fact that the locking legs 24, 25 of the shank members anchor at diagonally opposite points in the respective parts in assembled relation.

Figs. 12 and 13 show a further form of fastening means embodying offset locking legs. The device may be constructed from a section of material comprising a body portion 30, and the free ends of which are bent back on opposite sides of said body to provide shank members comprising relatively yieldable leg elements 31, 33 and 32, 34, the leg elements 33, 34 being offset laterally in opposite directions to provide locking prongs 35, 36.

Figs. 14 and 15 show a still further form of fastening means comprising shank members having relatively yieldable leg elements 41, 43 and 42, 44, disposed on opposite sides of the body portion 40, the locking legs 43, 44 being offset in the same direction to provide the anchoring prongs 45, 46.

Figs. 16-19 inclusive show another form of fastening means and its method of application to anchoring engagement in a plastic part. The device may be constructed from a strip 50 the free ends of which are bent back to provide relatively yieldable, locking legs 53, 54 which are suitably notched to provide anchoring prongs 55 on leg 53 and 56 on leg 54 respectively. Thus, when a shank member of this form of fastening means is applied to a hole in the boss D'' in a plastic part B'', Fig. 17, the leg 54 will flex and yield as the shank is advanced to its home position whereupon the prongs 56 embed themselves in the hole to rigidly lock in the plastic part against loosening and reverse movement therefrom as exemplified in Fig. 18.

Figs. 19 and 20 show an alternate construction of this form of the fastening means wherein the free legs 63, 64 carried by main legs 61, 62 of the body portion 60, are corrugated transversely to protrude the corners 65, 66, which serve as anchoring prongs.

Figs. 21-29 inclusive illustrate various applications and uses of the fastening means in accordance with the method of the invention. In Fig. 21 a form of the fastening means designated generally as 3, is shown in applied holding position in holes 1, 2 of complementary plastic parts H, I, in a corner joint structure, the fastening means being applied in substantially the method outlined with respect to Figs. 1-3 inclusive. Fig. 22 represents a joint structure of complementary plastic parts J, K, one of which may be relatively thin to serve as a dial panel in a radio cabinet, for example. In such installations, it is desirable that the fastening means be unexposed and accordingly a boss J' is provided on the relatively thin panel J, which boss is suitably recessed to receive a shank member of the fastening means, the cooperating part K, being provided with a recess 2 to receive the opposite shank of the fastening means. Figs. 23 and 24 show a method for connecting a plastic part M to a relatively thin cooperating member L and in which it is not expedient to provide the same with a shank receiving fastening element. The plastic part M, is provided with holes 1, 2 in which are anchored the respective shanks 4, 5 of a U-shaped fastening means including a body portion 6, the fastening means being connected to the part L by means of apertures 1a, 2a therein and through which the said shank members are passed. As shown in Fig. 24, the shank members may comprise laterally offset, relatively yieldable leg elements applied to anchored engagement in the plastic part as outlined above. It is obvious however that other forms of shank members, similar in use and comprising relatively yieldable leg elements may be employed in accordance with the teachings of the herein described method. It is also obvious that only a single shank member need be employed, the portion 6 serving as the head member and to which a cooperating object may be connected by any suitable form of connecting means.

Figs. 25-29 inclusive show the instant method as followed in application to specific forms of hollow objects. In Fig. 25 an object in the form of a sphere or the like, is molded in separate parts N, O each of which is provided with an integral boss or nub N', O', which are provided with suitable holes adapted to receive the shank members of the fastening means 3 as set forth with respect to Figs. 1-3 inclusive. Figs. 26 and 27 show a hollow, substantially cylindrical object comprising separately molded parts P, Q, R, held in assembled relation by a plurality of fastening means 3, the shank members of which engage in suitable holes provided at spaced points in the respective parts, the holes preferably being blind, such that the fastening means are unexposed.

Figs. 28 and 29 disclose an assembly of a spool-like, hollow object comprising separately molded parts S, T, U, the main body portion T, of which has a thickness too thin to be provided with holes to receive the shank members of the fastening means. Accordingly, as shown particularly in Fig. 29, the relatively thick base parts S, U are provided with suitable spaced holes which receive the locking shank members 7, of the fastening means such that the locking legs of the oppositely extending shank members 8 project into the path of the main body portion T in assembled relation. Thus, when the member T is advanced to assembled relation with the base parts S, U, the prongs presented by the locking legs of the shank members 8 are caused to become embedded in the adjacent inner side-walls of said member T and thereby resist reverse movement or loosening of the parts from assembled relation.

From the foregoing it may be readily appreciated that the method herein disclosed solves a most difficult problem in the art of joining and connecting hardened plastic and like parts in assembled relation. It will also be observed that the problem is accomplished through the use of simple, inexpensive and easily and quickly applied fastening means of various types.

It will also be seen that the herein described method of assembling plastic parts is most advantageous in mass production since the type of fastening means employed in the method are effectively applied without the use of the separate tools, involved, time-consuming assembling operations and special equipment.

While the method of the invention has been described in detail with specific examples such examples are illustrative only, since other modifications within the spirit and scope of the invention will be apparent to those skilled in the art. Hence the invention is to be understood as limited only as indicated in the appended claims in which the intent is to set forth all the novelty over the prior art.

What is claimed is:

1. In a fastening installation for light weight parts, a resilient connection for securing relatively thin hardened plastic parts in spaced relation, said resilient connection comprising integral connecting bosses provided on said relatively thin plastic parts and having fastener receiving recesses formed therein, a substantial clip for connecting said parts, said clip comprising a double-ended fastener provided from a strip of sheet metal having a portion bent back upon itself at either end thereof to provide distinct yieldable locking leg members having anchoring prongs and each integrally united with the strip in the leading end thereof, said yieldable locking leg members being receivable in the recesses in the connecting bosses on said parts to engage therein under tension in applied fastening position with the anchoring prongs thereof embedded in the side-walls of said recesses, thereby resiliently holding said relatively thin plastic parts substantially locked in spaced assembled relation without causing fracture or breaking of said connecting bosses thereon.

2. In a fastening installation for light weight parts, a resilient connection for securing relatively thin hardened plastic parts in spaced relation, said resilient connection comprising integral connecting bosses provided on said relatively thin plastic parts and having fastener receiving recesses formed therein, and a securing device comprising a double-ended fastening provided from a strip of metal having its end portions bent to form yieldable locking legs, said yieldable locking legs being receivable in the recesses of said connecting bosses under tension in applied fastening position, thereby resiliently holding said relatively thin plastic parts substantially locked in spaced assembled relation without causing fracture or breaking of said connecting bosses thereon.

3. In a fastening installation for light weight parts, a resilient connection for securing a relatively thin hardened plastic part to a cooperating part in spaced relation thereto, said resilient connection comprising an integral connecting boss provided on said relatively thin plastic part and having a fastener receiving recess formed therein, and a clip device for connecting said parts, said clip device comprising a strip of metal having a portion thereof bent to form a yieldable locking leg receivable in the recess of said connecting boss on the plastic part under tension in applied fastening position to resiliently hold said plastic part in spaced assembled relation to said cooperating part without causing fracture or breaking of said connecting boss thereon.

4. In a fastening installation for light weight parts, a resilient connection for securing relatively thin hardened plastic parts in spaced relation, said resilient connection comprising integral connecting bosses provided on said relatively thin plastic parts and having fastener receiving recesses formed therein, and a securing device comprising a double-ended fastener provided from a strip of metal having portions thereof bent to form yieldable locking legs provided with anchoring prongs, said locking legs being receivable in the recesses of said connecting bosses under tension in applied fastening position with the anchoring prongs thereof embedded in the side-walls of said recesses, thereby resiliently holding said relatively thin plastic parts substantially locked in assembled relation without causing fracture or breaking of said connecting bosses thereon.

5. In a fastening installation for light weight parts, a resilient connection for securing hardened plastic parts, said parts having fastener receiving recesses formed therein adapted to receive a substantial clip, said clip comprising a double-ended fastener provided from a strip of metal having portions thereof bent to provide distinct yieldable locking leg members provided with anchoring prongs, said yieldable locking leg members being receivable in said recesses in the hardened plastic parts to engage therein under tension in applied fastening position with the anchoring prongs thereof embedded in the side-walls of said recesses, thereby resiliently holding said hardened plastic parts substantially locked in assembled relation without causing fracture or breaking of said plastic parts in the area of said fastener receiving recesses therein.

GEORGE A. TINNERMAN.